J. W. CONGEAR.
HOE.
APPLICATION FILED JAN. 12, 1911.
1,015,478.
Patented Jan. 23, 1912.
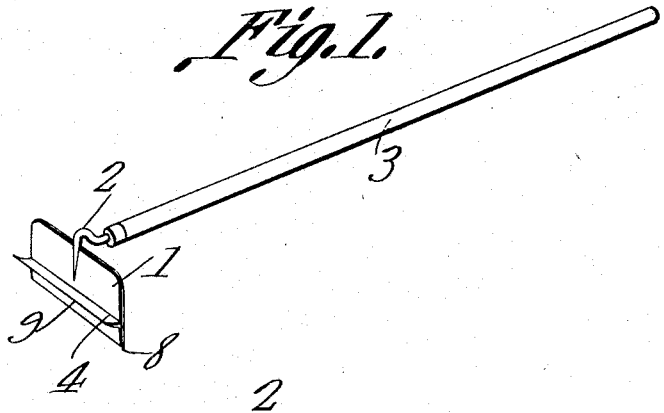
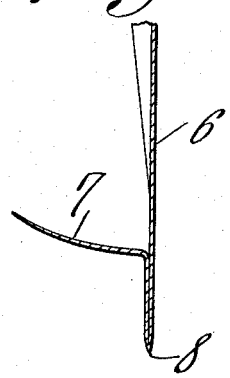
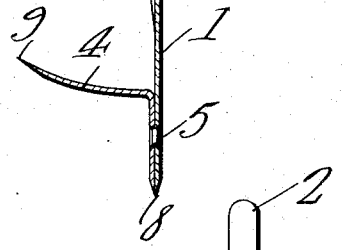
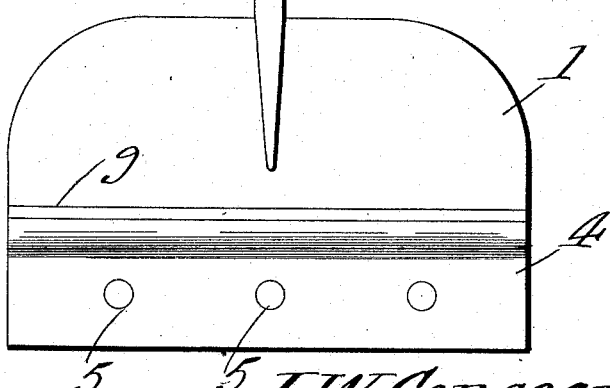
Witnesses:
J. W. Congear, Inventor,
by
Attorneys.

UNITED STATES PATENT OFFICE.

JOSEPH W. CONGEAR, OF SPARKS, GEORGIA.

HOE.

1,015,478.  Specification of Letters Patent.  Patented Jan. 23, 1912.

Application filed January 12, 1911. Serial No. 602,252.

*To all whom it may concern:*

Be it known that I, JOSEPH W. CONGEAR, a citizen of the United States, residing at Sparks, in the county of Berrien and State of Georgia, have invented a new and useful Hoe, of which the following is a specification.

This invention relates generally to hoes, and more particularly to one adapted for use in chopping cotton.

The object of the invention is to provide a hoe which shall be operative for cutting cotton both on the push and the draw of the blade, whereby, in the same length of time, to accomplish double the work without additional labor.

With the above and other objects in view, as will appear as the nature of the invention is better understood, the same consists in the novel construction and combination of parts of a hoe as will be hereinafter fully described and claimed.

In the accompanying drawing forming a part of this specification, and in which like characters of reference indicate corresponding parts:—Figure 1 is a view in perspective of a hoe constructed in accordance with the present invention. Fig. 2 is a vertical transverse sectional view, on an enlarged scale. Fig. 3 is a view in front elevation. Fig. 4 is a sectional detail view of a slightly modified form of hoe.

Referring to the drawing, 1 designates an ordinary hoe blade to which is attached in any preferred manner a shank 2 to enter a handle 3. These parts may be of the usual or any preferred construction, and therefore need no further description.

The gist of the invention resides in combining with the front of the main blade 1 a supplemental blade 4, which is preferably slightly dished upward, and is secured to the main blade, in this instance, by rivets 5, of which there may be any preferred number, three being shown. The lower edge of the supplemental blade lies flush with the main blade, and is sharpened, as shown in Fig. 2. While it will generally be preferred to secure the two blades together as described, it is to be understood that they may be made integral, as shown in Fig. 4, wherein 6 designates the main blade and 7 the supplemental blade.

In the use of the device, on the back stroke of the hoe blade, the edge 8 will do the cutting, and on the reverse movement, the edge 9 will come into operation, so that it will be seen that a double cutting action takes place, which will largely facilitate the work, and will permit an operator to accomplish in the same time double the work that can be done with the old style blade, and without any additional labor.

I claim:—

1. A hoe comprising a main and a supplemental blade, the latter blade being in contact with the outer face of the main blade from the cutting edge to a point adjacent to its median line and thence deflected outward at approximately right angles thereto.

2. A hoe comprising a main and a supplemental blade, the latter being in contact with the outer face of the main blade from the cutting edge to a point adjacent to its median line and thence deflected outward and approximately at right angles thereto and curved upward.

3. A hoe comprising a main and a supplemental blade assembled to provide a digging edge, the supplemental blade being in contact with the outer face of the main blade from the digging edge to a point adjacent its median line and thence deflected outward and upward and sharpened to provide a cutting edge.

In testimony that I claim the foregoing as my own, I have hereto affixed my signature in the presence of two witnesses.

JOSEPH W. CONGEAR.

Witnesses:
BENJ. F. GARY,
JOHN B. CHILES.

Copies of this patent may be obtained for five cents each, by addressing the "Commissioner of Patents, Washington, D. C."